United States Patent [19]

Spieser et al.

[11] Patent Number: 4,780,907

[45] Date of Patent: Oct. 25, 1988

[54] METHOD OF MEASURING THE TYPES OF MOTION AND CONFIGURATION OF BIOLOGICAL AND NON-BIOLOGICAL OBJECTS

[75] Inventors: Hunrich Spieser, Alling; Heinz Frisch, Karlsfeld, both of Fed. Rep. of Germany

[73] Assignee: Gesellschaft für Strahlen- und Unweltforschung mbH, Neuherberg, Fed. Rep. of Germany

[21] Appl. No.: 940,284

[22] Filed: Dec. 9, 1986

[30] Foreign Application Priority Data

Dec. 10, 1985 [DE] Fed. Rep. of Germany ....... 3543515

[51] Int. Cl.$^4$ .............................................. G06K 9/00
[52] U.S. Cl. .......................................... 382/6; 382/1; 358/105
[58] Field of Search ................. 358/22, 105, 160, 183; 382/1, 6; 364/413

[56] References Cited

U.S. PATENT DOCUMENTS

| | | | |
|---|---|---|---|
| 4,233,631 | 11/1980 | Mahler | 358/22 |
| 4,249,212 | 2/1981 | Ito et al. | 358/22 |
| 4,706,296 | 11/1987 | Pedotti et al. | 382/6 |
| 4,713,693 | 12/1987 | Southworth et al. | 358/160 |

OTHER PUBLICATIONS

Spieser; "Methoden der Toxizitatsprüfung an Fischen" (Methods of Testing Toxicity in Fish), DFG, Boldt-Verlag, Boppard, 1980.

*Primary Examiner*—James J. Groody
*Assistant Examiner*—Michael D. Parker
*Attorney, Agent, or Firm*—Spencer & Frank

[57] ABSTRACT

A method for measuring the type of motion and configuration of objects by observation of the objects and evaluation of the observation results, including the steps of: producing data representative of an image of the objects in a selected plane at successive time intervals; deriving, from the data, for each time interval, a representation of only one pair of coordinate values in the plane for each object; producing, from the coordinate values, representations of motion paths for the objects during a plurality of the time intervals; and producing, from the motion path representations, representations of the path traversed by each object, and the average local position, the period of dwell and number of reversals of direction of motion of each object during the plurality of time intervals.

21 Claims, 22 Drawing Sheets

| Nr. | SH | SHD | PPR | Turn | Motility | Derivat | Diagram |
|---|---|---|---|---|---|---|---|
| H | 6 | 5,8 | 58 | 17 | 1.47E+00 | 1.70E+00 | === |
| Q | 2 | 1,7 | 86 | 23 | 2.02E+00 | 1.98E+00 | ==== |
| K | 3 | 2,1 | 85 | 32 | 2.03E+00 | 1.28E+00 | ==== |
| L | 3 | 2,4 | 86 | 20 | 2.10E+00 | 1.18E+00 | ==== |
| M | 2 | 1,4 | 93 | 28 | 2.12E+00 | 5.82E-01 | ==== |
| E | 3 | 2,6 | 95 | 22 | 2.23E+00 | 1.61E+00 | ==== |
| D | 2 | 1,3 | 93 | 29 | 2.51E+00 | 1.69E+00 | ===== |
| N | 4 | 3,1 | 93 | 33 | 2.62E+00 | 1.19E+00 | ===== |
| I | 7 | 6,3 | 96 | 26 | 3.50E+00 | 1.99E+00 | ======= |
| P | 4 | 3,8 | 85 | 32 | 3.80E+00 | 6.62E-01 | ======= |
| J | 4 | 3,7 | 81 | 30 | 3.40E+00 | 1.125+00 | ======= |
| F | 5 | 4,4 | 85 | 44 | 3.81E+00 | 1.82E+00 | ======== |
| B | 7 | 6,5 | 94 | 46 | 3.84E+00 | 1.34E+00 | ======== |
| O | 7 | 6,6 | 85 | 43 | 3.88E+00 | 1.82E+00 | ======== |
| C | 6 | 5,9 | 86 | 36 | 3.84E+00 | 1.88E+00 | ======== |
| R | 2 | 1,6 | 87 | 41 | 4.25E+00 | 2.27E+00 | ========= |
| A | 7 | 6,0 | 96 | 38 | 5.83E+00 | 2.99E+00 | ========== |
| G | 7 | 6,4 | 90 | 71 | 6.37E+00 | 3.49E+00 | ============= |

Fig. 2a

| Nr. | SH | SHD | PPR | Turn | Motility | Derivat | Diagram |
|---|---|---|---|---|---|---|---|
| N | 4 | 1.4 | 67 | 2 | 2.52E-01 | 1.49E+00 | = |
| B | 5 | 3,7 | 97 | 18 | 1.46E+00 | 7.45E-01 | === |
| T | 2 | 2,7 | 36 | 24 | 1.72E+00 | 1.53E+00 | === |
| P | 5 | 2,6 | 84 | 29 | 1.73E+00 | 1.72E+00 | === |
| H | 7 | 5,1 | 52 | 18 | 1.76E+00 | 1.75E+00 | ==== |
| O | 2 | 2,8 | 96 | 20 | 1.81E+00 | 1.17E+00 | ==== |
| S | 2 | 3,0 | 88 | 23 | 1.89E+00 | 7.64E-01 | ==== |
| J | 5 | 3,5 | 95 | 22 | 1.92E+00 | 1.04E+00 | ==== |
| A | 2 | 2,7 | 89 | 23 | 2.03E+00 | 2.09E+00 | ==== |
| E | 7 | 5,2 | 92 | 16 | 2.20E+00 | 2.09E+00 | ==== |
| N | 2 | 2,6 | 90 | 32 | 2.43E+00 | 1.02E+00 | ===== |
| F | 5 | 3,1 | 81 | 24 | 2.68E+00 | 1.67E+00 | ===== |
| K | 7 | 5,4 | 88 | 31 | 2.73E+00 | 1.17E+00 | ===== |
| I | 5 | 2,9 | 93 | 30 | 2.75E+00 | 7.05E-01 | ====== |
| U | 3 | 3,1 | 68 | 30 | 2.84E+00 | 1.67E+00 | ====== |
| Q | 3 | 2,2 | 80 | 25 | 2.90E+00 | 5.30E-01 | ====== |
| A | 7 | 5,9 | 83 | 36 | 3.10E+00 | 8.78E-01 | ====== |
| D | 7 | 5,6 | 73 | 34 | 3.25E+00 | 3.11E-01 | ====== |
| B | 6 | 3,9 | 51 | 31 | 3.30E+00 | 9.43E-01 | ======= |
| G | 6 | 4,8 | 85 | 31 | 3.40E+00 | 8.80E-01 | ======= |
| L | 4 | 1,4 | 76 | 25 | 3.90E+00 | 1.73E+00 | ======== |

Fig. 2b

| Nr. | SH | SHD | PPR | Turn | Motility | Derivat | Diagram |
|---|---|---|---|---|---|---|---|
| J | 5 | 4,6 | 96 | 20 | 1.87E+00 | 2.12E+00 | ==== |
| D | 5 | 4,6 | 100 | 28 | 2.28E+00 | 1.66E+00 | ===== |
| F | 3 | 2,4 | 98 | 28 | 2.28E+00 | 1.80E+00 | ===== |
| I | 3 | 2,0 | 82 | 30 | 2.29E+00 | 1.62E+00 | ===== |
| K | 2 | 1,5 | 97 | 36 | 2.30E+00 | 5.49E-01 | ===== |
| H | 3 | 2,6 | 94 | 31 | 2.45E+00 | 2.75E+00 | ===== |
| E | 6 | 6,5 | 96 | 23 | 2.53E+00 | 1.37E+00 | ===== |
| L | 4 | 3,2 | 89 | 24 | 2.71E+00 | 2.30E+00 | ===== |
| Q | 2 | 1,4 | 95 | 31 | 2.83E+00 | 5.77E-01 | ====== |
| C | 7 | 6,4 | 93 | 28 | 2.89E+00 | 1.32E+00 | ====== |
| B | 7 | 6,2 | 99 | 33 | 2.80E+00 | 1.73E+00 | ====== |
| O | 5 | 4,9 | 91 | 37 | 3.07E+00 | 1.66E+00 | ====== |
| H | 3 | 2,2 | 85 | 29 | 3.11E+00 | 1.83E+00 | ====== |
| A | 7 | 6,5 | 95 | 33 | 3.54E+00 | 1.64E+00 | ======= |
| N | 2 | 1,7 | 94 | 40 | 4.33E+00 | 2.68E+00 | ======== |

Fig. 2c

| Nr. | SH | SHD | PPR | Turn | Motility | Derivat | Diagram |
|---|---|---|---|---|---|---|---|
| R | 6 | 3,7 | 52 | 43 | 6.28E+00 | 4.08E+00 | ============= |
| K | 5 | 0,7 | 61 | 43 | 6.38E+00 | 4.84E+00 | ============= |
| N | 6 | 4,4 | 62 | 51 | 6.48E+00 | 4.28E+00 | ============= |
| Q | 7 | 4,8 | 59 | 51 | 6.98E+00 | 5.02E+00 | ============== |
| S | 4 | 0,4 | 65 | 36 | 7.85E+00 | 5.62E+00 | ============== |
| B | 7 | 5,1 | 72 | 78 | 7.28E+00 | 5.07E+00 | ============== |
| I | 7 | 5,0 | 80 | 65 | 7.33E+00 | 5.82E+00 | ============== |
| O | 6 | 4,1 | 68 | 57 | 7.56E+00 | 5.63E+00 | ============== |
| J | 5 | 1,8 | 71 | 41 | 7.54E+00 | 6.30E+00 | ============== |
| M | 4 | 1,8 | 68 | 46 | 7.87E+00 | 6.54E+00 | =============== |
| L | 5 | 1,2 | 52 | 47 | 7.91E+00 | 5.88E+00 | =============== |
| H | 4 | 0,3 | 70 | 51 | 7.86E+00 | 6.31E+00 | =============== |
| E | 5 | 4,6 | 76 | 59 | 8.05E+00 | 6.23E+00 | =============== |
| U | 5 | 2,8 | 68 | 62 | 8.15E+00 | 6.19E+00 | =============== |
| A | 5 | 2,7 | 85 | 77 | 8.33E+00 | 6.64E+00 | ================ |
| P | 6 | 4,2 | 76 | 54 | 8.37E+00 | 6.38E+00 | ================ |
| F | 5 | 4,6 | 70 | 71 | 8.47E+00 | 6.47E+00 | ================ |
| C | 5 | 3,3 | 9: | 72 | 8.54E+00 | 6.69E+00 | ================ |
| G | 5 | 3,5 | 78 | 75 | 8.57E+00 | 6.74E+00 | ================ |

Fig. 3a

| Nr. | SH | SHD | PPR | TURN | Motility | Derivat | Diagram |
|-----|----|----|-----|------|----------|---------|---------|
| N | 5 | 1,9 | 45 | 38 | 3.74E+00 | 1.67E+00 | ======= |
| Q | 3 | 4,2 | 40 | 27 | 4.07E+00 | 2.07E+00 | ======== |
| R | 6 | 3,4 | 46 | 37 | 4.95E+00 | 2.47E+00 | ========= |
| T | 7 | 4,9 | 62 | 51 | 5.19E+00 | 3.48E+00 | ========= |
| G | 7 | 5,3 | 66 | 52 | 5.87E+00 | 3.69E+00 | ========== |
| K | 5 | 2,0 | 62 | 54 | 6.26E+00 | 4.51E+00 | =========== |
| E | 7 | 5,2 | 71 | 78 | 6.63E+00 | 4.62E+00 | =========== |
| D | 6 | 3,5 | 62 | 54 | 6.74E+00 | 4.64E+00 | =========== |
| P | 4 | 1,1 | 61 | 56 | 6.75E+00 | 4.93E+00 | ============ |
| S | 5 | 0,9 | 60 | 43 | 6.81E+00 | 5.05E+00 | ============ |
| F | 5 | 2,1 | 64 | 53 | 7.21E+00 | 5.09E+00 | ============ |
| L | 5 | 2,2 | 61 | 54 | 7.34E+00 | 3.43E+00 | ============= |
| H | 6 | 4,3 | 71 | 62 | 7.70E+00 | 5.95E+00 | ============= |
| A | 4 | 2,2 | 65 | 48 | 7.84E+00 | 6.27E+00 | ============== |
| C | 6 | 4,3 | 72 | 67 | 7.95E+00 | 5.93E+00 | ============== |
| H | 4 | 1,2 | 77 | 47 | 8.24E+00 | 7.02E+00 | ============== |
| I | 6 | 4,1 | 78 | 65 | 8.32E+00 | 6.39E+00 | =============== |
| J | 5 | 2,1 | 74 | 55 | 8.42E+00 | 6.95E+00 | =============== |
| B | 4 | 1,1 | 83 | 63 | 8.74E+00 | 7.37E+00 | =============== |
| D | 3 | 1,5 | 64 | 53 | 9.64E+00 | 8.08E+00 | ================ |

Fig. 3b

| Nr. | SH | SHD | PPR | TURN | Motility | Derivat | Diagram |
|-----|----|----|-----|------|----------|---------|---------|
| R | 5 | 1,7 | 51 | 41 | 5.25E+00 | 2.80E+00 | ========== |
| I | 7 | 4,1 | 55 | 40 | 5.31E+00 | 3.21E+00 | ========== |
| N | 4 | 3,3 | 52 | 35 | 5.35E+00 | 3.85E+00 | ========== |
| K | 7 | 4,8 | 86 | 51 | 5.58E+00 | 3.20E+00 | ========== |
| B | 7 | 4,8 | 68 | 49 | 5.80E+00 | 3.89E+00 | =========== |
| O | 5 | 1,9 | 63 | 58 | 6.25E+00 | 4.23E+00 | ============ |
| J | 7 | 5,9 | 80 | 56 | 6.27E+00 | 4.17E+00 | ============ |
| L | 5 | 2,9 | 70 | 28 | 6.44E+00 | 4.89E+00 | ============ |
| P | 5 | 0,2 | 66 | 36 | 6.48E+00 | 4.67E+00 | ============ |
| M | 6 | 2,6 | 56 | 45 | 6.52E+00 | 3.78E+00 | ============ |
| B | 6 | 4,2 | 81 | 59 | 6.71E+00 | 4.84E+00 | ============ |
| G | 6 | 3,3 | 67 | 62 | 6.89E+00 | 4.56E+00 | ============ |
| Q | 5 | 0,3 | 58 | 41 | 6.93E+00 | 5.35E+00 | ============= |
| F | 6 | 3,6 | 70 | 71 | 6.94E+00 | 4.93E+00 | ============= |
| H | 7 | 4,5 | 62 | 64 | 7.07E+00 | 4.36E+00 | ============= |
| A | 7 | 3,6 | 80 | 71 | 7.22E+00 | 4.74E+00 | ============= |
| C | 6 | 4,0 | 73 | 66 | 7.35E+00 | 5.00E+00 | ============== |
| E | 5 | 2,6 | 77 | 56 | 7.51E+00 | 5.97E+00 | ============== |
| D | 6 | 3,4 | 80 | 68 | 8.16E+00 | 6.08E+00 | =============== |

Fig. 3c

| Nr. | SH | SHD | PPR | TURN | Motility | Derivat | Diagram |
|---|---|---|---|---|---|---|---|
| R | 7 | 4,1 | 57 | 50 | 3.84E+00 | 1.63E+00 | ======== |
| E | 7 | 1,7 | 97 | 53 | 5.13E+00 | 3.31E+00 | ========= |
| I | 7 | 1,6 | 88 | 59 | 5.34E+00 | 3.98E+00 | ========== |
| B | 7 | 2,9 | 95 | 56 | 5.56E+00 | 3.24E+00 | ========== |
| U | 4 | 5,7 | 76 | 48 | 5.65E+00 | 4.84E+00 | ========== |
| O | 7 | 3,0 | 66 | 66 | 5.76E+00 | 3.43E+00 | =========== |
| T | 6 | 4,0 | 64 | 62 | 6.12E+00 | 4.17E+00 | =========== |
| H | 7 | 1,6 | 81 | 87 | 6.23E+00 | 4.51E+00 | ============ |
| R | 7 | 2,7 | 76 | 79 | 6.51E+00 | 4.69E+00 | ============ |
| L | 7 | 0,4 | 83 | 55 | 6.57E+00 | 4.87E+00 | ============ |
| S | 7 | 3,3 | 70 | 58 | 6.70E+00 | 4.30E+00 | ============ |
| Q | 7 | 2,7 | 71 | 58 | 6.90E+00 | 4.81E+00 | ============= |
| D | 7 | 1,4 | 87 | 73 | 6.92E+00 | 5.24E+00 | ============= |
| C | 6 | 1,8 | 89 | 74 | 7.13E+00 | 3.31E+00 | ============= |
| N | 7 | 2,0 | 83 | 71 | 7.28E+00 | 5.95E+00 | ============== |
| J | 7 | 1,6 | 75 | 86 | 7.32E+00 | 5.23E+00 | ============== |
| F | 7 | 1,8 | 84 | 92 | 7.87E+00 | 6.08E+00 | =============== |
| V | 5 | 5,1 | 77 | 57 | 7.99E+00 | 6.37E+00 | =============== |
| A | 7 | 0,4 | 92 | 82 | 8.03E+00 | 6.26E+00 | =============== |
| P | 5 | 4,3 | 85 | 75 | 8.22E+00 | 6.52E+00 | =============== |
| K | 7 | 1,1 | 79 | 94 | 8.24E+00 | 6.03E+00 | =============== |
| Q | 7 | 1,6 | 84 | 70 | 8.72E+00 | 6.76E+00 | ================ |

Fig. 4a

| No. | SH | SHD | PPR | TURN | MOTILITY | DERIVAT | DIAGRAMM |
|-----|----|----|-----|------|----------|---------|----------|
| B | 3 | 2.5 | 40 | 27 | 3,70E+00 | 1,98E+00 | ======= |
| Q | 5 | 4.2 | 60 | 30 | 3,86E+00 | 2,19E+00 | ======== |
| V | 6 | 5.4 | 58 | 30 | 4,85E+00 | 2.50E+00 | ========= |
| O | 3 | 1.9 | 91 | 36 | 4,89E+00 | 3,87E+00 | ========= |
| H | 7 | 6.4 | 92 | 66 | 5,99E+00 | 3,79E+00 | ========== |
| F | 7 | 6.2 | 92 | 77 | 5.75E+00 | 4,83E+00 | =========== |
| R | 7 | 5.5 | 75 | 72 | 6.78E+00 | 4,78E+00 | ============ |
| B | 7 | 6.0 | 93 | 75 | 6.79E+00 | 4.72E+00 | ============ |
| K | 7 | 5.8 | 92 | 69 | 6.82E+00 | 5.41E+00 | ============ |
| C | 7 | 6.4 | 93 | 71 | 6.82E+00 | 4.97E+00 | ============ |
| J | 7 | 6.2 | 88 | 67 | 7,02E+00 | 4.27E+00 | ============ |
| N | 5 | 3.9 | 91 | 55 | 7,10E+00 | 5,63E+00 | ============ |
| L | 6 | 5.2 | 95 | 69 | 7,28E+00 | 5,33E+00 | ============= |
| D | 7 | 6.2 | 96 | 80 | 7,31E+00 | 5.44E+00 | ============= |
| M | 6 | 4.7 | 88 | 69 | 7.51E+00 | 5.39E+00 | ============= |
| G | 6 | 5.7 | 95 | 78 | 7,52E+00 | 5,33E+00 | ============= |
| I | 6 | 5.2 | 80 | 75 | 7,60E+00 | 5.71E+00 | ============= |
| A | 7 | 6.2 | 92 | 82 | 7,63E+00 | 5,75E+00 | ============= |
| O | 7 | 6.3 | 95 | 79 | 7,74E+00 | 5,89E+00 | ============= |

Fig. 4b

| Nr. | SH | SHD | PPR | TURN | Motility | DERIVAT | Diagram |
|---|---|---|---|---|---|---|---|
| S | 4 | 4.9 | 55 | 20 | 2,19E+00 | 1,06E+00 | ==== |
| T | 6 | 4.0 | 43 | 26 | 3,32E+00 | 1,30E+00 | ====== |
| R | 5 | 5.4 | 40 | 27 | 4,03E+00 | 1,87E+00 | ======= |
| B | 7 | 5.1 | 95 | 51 | 3,23E+00 | 2,74E+00 | ========= |
| Q | 5 | 1.9 | 97 | 48 | 5,29E+00 | 4,43E+00 | ========= |
| I | 6 | 1.0 | 74 | 45 | 5,61E+00 | 3,10E+00 | ========= |
| P | 5 | 1.3 | 91 | 61 | 6,31E+00 | 4,09E+00 | =========== |
| K | 6 | 3.4 | 88 | 67 | 6,38E+00 | 4,21E+00 | =========== |
| A | 7 | 4.7 | 86 | 77 | 6,38E+00 | 4,35E+00 | =========== |
| H | 7 | 4.7 | 92 | 38 | 6,49E+00 | 4,91E+00 | =========== |
| J | 6 | 2.9 | 92 | 70 | 6,57E+00 | 4,66E+00 | =========== |
| C | 7 | 4.8 | 91 | 72 | 6,66E+00 | 4,25E+00 | =========== |
| D | 6 | 2.3 | 84 | 58 | 7,16E+00 | 5,23E+00 | ============ |
| H | 7 | 4.5 | 88 | 66 | 7,31E+00 | 5,18E+00 | ============ |
| G | 7 | 4.0 | 89 | 76 | 7,39E+00 | 5,29E+00 | ============ |
| E | 7 | 4.7 | 91 | 89 | 7,61E+00 | 5,29E+00 | ============ |
| F | 7 | 4.5 | 93 | 73 | 7,67E+00 | 5,49E+00 | ============ |
| N | 7 | 3.6 | 86 | 78 | 7,69E+00 | 5,45E+00 | ============ |
| D | 7 | 4.7 | 93 | 88 | 8,29E+00 | 6,31E+00 | ============== |
| L | 6 | 3.6 | 88 | 81 | 8,46E+00 | 6,00E+00 | ============== |

Fig. 4c

PLANE 0

| | AVG | SDEV | SEM | DIAGRAM OF AVG |
|---|---|---|---|---|
| 0: | 2.81 | 0.66 | 0.39 | ++++++ |
| 1: | 2.48 | 0.56 | 0.36 | +++++ |
| 2: | 2.34 | 0.50 | 0.32 | +++++ |
| 3: | 2.15 | 0.41 | 0.28 | ++++ |
| 4: | 2.00 | 0.38 | 0.27 | ++++ |
| 5: | 1.96 | 0.37 | 0.27 | ++++ |
| 6: | 1.79 | 0.43 | 0.32 | ++++ |
| 7: | 1.64 | 0.48 | 0.38 | +++ |
| 8: | 1.41 | 0.49 | 0.42 | +++ |
| 9: | 1.27 | 0.45 | 0.40 | +++ |
| 10: | 1.13 | 0.34 | 0.32 | ++ |
| 11: | 1.07 | 0.26 | 0.25 | ++ |
| 12: | 1.01 | 0.10 | 0.10 | ++ |
| 13: | 1.00 | 0.00 | 0.00 | ++ |
| 14: | 1.00 | 0.00 | 0.00 | ++ |
| 15: | 1.00 | 0.00 | 0.00 | ++ |
| 16: | 0.99 | 0.10 | 0.10 | ++ |
| 17: | 0.96 | 0.20 | 0.20 | ++ |

Fig. 5a

Plane 1

|     | AVG  | SDEV | SEM  | DIAGRAM OF AVG |
|-----|------|------|------|----------------|
| 0:  | 4.55 | 0.89 | 0.42 | +++++++++      |
| 1:  | 4.18 | 0.82 | 0.40 | ++++++++       |
| 2:  | 3.93 | 0.70 | 0.35 | ++++++++       |
| 3:  | 3.72 | 0.73 | 0.38 | +++++++        |
| 4:  | 3.37 | 0.69 | 0.38 | +++++++        |
| 5:  | 3.11 | 0.58 | 0.33 | ++++++         |
| 6:  | 2.90 | 0.46 | 0.27 | ++++++         |
| 7:  | 2.73 | 0.49 | 0.30 | +++++          |
| 8:  | 2.56 | 0.52 | 0.32 | +++++          |
| 9:  | 2.37 | 0.49 | 0.32 | +++++          |
| 10: | 2.22 | 0.48 | 0.32 | ++++           |
| 11: | 2.09 | 0.45 | 0.31 | ++++           |
| 12: | 1.88 | 0.46 | 0.33 | ++++           |
| 13: | 1.64 | 0.52 | 0.41 | +++            |
| 14: | 1.43 | 0.52 | 0.43 | +++            |
| 15: | 1.20 | 0.40 | 0.37 | ++             |
| 16: | 1.09 | 0.32 | 0.31 | ++             |
| 17: | 1.00 | 0.28 | 0.28 | ++             |

Fig. 5b

PLANE 2

| | AVG | SDEV | SEM | DIAGRAM OF AVG |
|---|---|---|---|---|
| 0: | 6.60 | 0.97 | 0.38 | ++++++++++++ |
| 1: | 6.04 | 0.99 | 0.40 | ++++++++++++ |
| 2: | 5.67 | 0.99 | 0.41 | +++++++++++ |
| 3: | 5.33 | 0.90 | 0.39 | +++++++++++ |
| 4: | 5.10 | 0.92 | 0.41 | ++++++++++ |
| 5: | 4.89 | 0.87 | 0.40 | ++++++++++ |
| 6: | 4.58 | 0.81 | 0.38 | +++++++++ |
| 7: | 4.30 | 0.78 | 0.38 | +++++++++ |
| 8: | 3.99 | 0.66 | 0.33 | ++++++++ |
| 9: | 3.74 | 0.56 | 0.29 | +++++++ |
| 10: | 3.58 | 0.66 | 0.35 | +++++++ |
| 11: | 3.25 | 0.63 | 0.35 | +++++++ |
| 12: | 3.05 | 0.58 | 0.33 | ++++++ |
| 13: | 2.84 | 0.56 | 0.33 | ++++++ |
| 14: | 2.51 | 0.54 | 0.34 | +++++ |
| 15: | 2.03 | 0.48 | 0.34 | ++++ |
| 16: | 1.50 | 0.56 | 0.46 | +++ |
| 17: | 1.15 | 0.46 | 0.43 | ++ |

Fig. 5c

PLANE 3

| | AVG | SDEV | SEM | DIAGRAM OF AVG |
|---|---|---|---|---|
| 0: | 9.75 | 1.65 | 0.53 | +++++++++++++++++++ |
| 1: | 8.44 | 1.34 | 0.46 | ++++++++++++++++ |
| 2: | 7.93 | 1.15 | 0.41 | +++++++++++++++ |
| 3: | 7.50 | 1.11 | 0.40 | +++++++++++++++ |
| 4: | 7.25 | 1.06 | 0.39 | ++++++++++++++ |
| 5: | 6.91 | 1.07 | 0.41 | ++++++++++++++ |
| 6: | 6.62 | 1.09 | 0.42 | +++++++++++++ |
| 7: | 6.29 | 1.03 | 0.41 | +++++++++++++ |
| 8: | 5.93 | 0.95 | 0.39 | ++++++++++++ |
| 9: | 5.56 | 0.99 | 0.42 | +++++++++++ |
| 10: | 5.20 | 0.77 | 0.34 | ++++++++++ |
| 11: | 4.84 | 0.69 | 0.31 | ++++++++++ |
| 12: | 4.44 | 0.76 | 0.36 | +++++++++ |
| 13: | 4.06 | 0.74 | 0.37 | ++++++++ |
| 14: | 3.68 | 0.68 | 0.35 | +++++++ |
| 15: | 3.23 | 0.71 | 0.39 | ++++++ |
| 16: | 2.52 | 0.66 | 0.41 | +++++ |
| 17: | 1.78 | 0.79 | 0.59 | ++++ |

Fig. 5d

PLANE 0

| | AVG | SDEV | SEM | DIAGRAM OF AVG |
|---|---|---|---|---|
| 0: | 3.51 | 0.77 | 0.41 | +++++++ |
| 1: | 3.10 | 0.67 | 0.38 | ++++++ |
| 2: | 2.91 | 0.65 | 0.38 | ++++++ |
| 3: | 2.69 | 0.65 | 0.39 | +++++ |
| 4: | 2.43 | 0.59 | 0.38 | +++++ |
| 5: | 2.30 | 0.54 | 0.36 | +++++ |
| 6: | 2.12 | 0.56 | 0.38 | ++++ |
| 7: | 1.97 | 0.50 | 0.36 | ++++ |
| 8: | 1.84 | 0.53 | 0.39 | ++++ |
| 9: | 1.67 | 0.55 | 0.43 | +++ |
| 10: | 1.45 | 0.54 | 0.45 | +++ |
| 11: | 1.37 | 0.51 | 0.43 | +++ |
| 12: | 1.19 | 0.39 | 0.36 | ++ |
| 13: | 1.12 | 0.33 | 0.31 | ++ |
| 14: | 1.05 | 0.22 | 0.21 | ++ |
| 15: | 1.01 | 0.10 | 0.10 | ++ |
| 16: | 1.01 | 0.10 | 0.10 | ++ |
| 17: | 0.76 | 0.43 | 0.49 | ++ |
| 18: | 0.72 | 0.45 | 0.53 | + |

Fig. 6a

PLANE 1

| | AVG | SDEV | SEM | DIAGRAM OF AVG |
|---|---|---|---|---|
| 0: | 6.20 | 1.09 | 0.44 | +++++++++++ |
| 1: | 5.66 | 1.03 | 0.43 | +++++++++++ |
| 2: | 5.27 | 1.02 | 0.45 | +++++++++++ |
| 3: | 5.07 | 0.97 | 0.43 | ++++++++++ |
| 4: | 4.81 | 0.93 | 0.42 | ++++++++++ |
| 5: | 4.50 | 0.95 | 0.45 | +++++++++ |
| 6: | 4.20 | 0.5 | 0.45 | ++++++++ |
| 7: | 3.90 | 0.85 | 0.43 | ++++++++ |
| 8: | 3.62 | 0.79 | 0.41 | +++++++ |
| 9: | 3.37 | 0.72 | 0.39 | +++++++ |
| 10: | 3.03 | 0.73 | 0.42 | ++++++ |
| 11: | 2.82 | 0.74 | 0.44 | ++++++ |
| 12: | 2.55 | 0.70 | 0.44 | +++++ |
| 13: | 2.34 | 0.67 | 0.44 | +++++ |
| 14: | 2.01 | 0.61 | 0.43 | ++++ |
| 15: | 1.69 | 0.58 | 0.45 | +++ |
| 16: | 1.39 | 0.51 | 0.43 | +++ |
| 17: | 0.95 | 0.66 | 0.67 | ++ |
| 18: | 0.76 | 0.51 | 0.59 | ++ |

Fig. 6b

PLANE 2

| | AVG | SDEV | SEM | DIAGRAM OF AVG |
|---|---|---|---|---|
| 0: | 9.08 | 1.44 | 0.48 | +++++++++++++++++ |
| 1: | 8.29 | 1.46 | 0.51 | ++++++++++++++++ |
| 2: | 7.78 | 1.32 | 0.47 | +++++++++++++++ |
| 3: | 7.46 | 1.24 | 0.45 | +++++++++++++++ |
| 4: | 7.22 | 1.26 | 0.47 | ++++++++++++++ |
| 5: | 6.98 | 1.23 | 0.47 | ++++++++++++++ |
| 6: | 6.66 | 1.22 | 0.47 | +++++++++++++ |
| 7: | 6.30 | 1.23 | 0.49 | +++++++++++++ |
| 8: | 5.95 | 1.14 | 0.47 | ++++++++++++ |
| 9: | 5.47 | 1.13 | 0.48 | +++++++++++ |
| 10: | 5.05 | 1.06 | 0.47 | ++++++++++ |
| 11: | 4.65 | 1.12 | 0.52 | +++++++++ |
| 12: | 4.14 | 1.03 | 0.51 | ++++++++ |
| 13: | 3.78 | 0.96 | 0.49 | ++++++++ |
| 14: | 3.30 | 0.85 | 0.47 | +++++++ |
| 15: | 2.81 | 0.85 | 0.51 | ++++++ |
| 16: | 2.23 | 0.87 | 0.59 | ++++ |
| 17: | 1.50 | 1.06 | 0.86 | +++ |
| 18: | 1.03 | 0.80 | 0.79 | ++ |

Fig. 6c

PLANE 3

| | AVG | SDEV | SEM | DIAGRAM OF AVG |
|---|---|---|---|---|
| 0: | 11.94 | 1.53 | 0.44 | ++++++++++++++++++++++++ |
| 1: | 11.17 | 1.60 | 0.48 | +++++++++++++++++++++++ |
| 2: | 10.56 | 1.51 | 0.46 | +++++++++++++++++++++ |
| 3: | 10.19 | 1.45 | 0.45 | +++++++++++++++++++++ |
| 4: | 9.87 | 1.49 | 0.47 | +++++++++++++++++++++ |
| 5: | 9.43 | 1.51 | 0.49 | ++++++++++++++++++++ |
| 6: | 9.07 | 1.49 | 0.49 | +++++++++++++++++++ |
| 7: | 8.74 | 1.47 | 0.50 | ++++++++++++++++++ |
| 8: | 8.43 | 1.53 | 0.53 | ++++++++++++++++++ |
| 9: | 8.02 | 1.54 | 0.55 | +++++++++++++++++ |
| 10: | 7.36 | 1.49 | 0.55 | ++++++++++++++ |
| 11: | 6.79 | 1.53 | 0.59 | ++++++++++++++ |
| 12: | 6.23 | 1.32 | 0.53 | +++++++++++++ |
| 13: | 5.52 | 1.25 | 0.58 | ++++++++++++ |
| 14: | 4.86 | 1.30 | 0.59 | ++++++++++ |
| 15: | 4.13 | 1.32 | 0.65 | +++++++++ |
| 16: | 3.25 | 1.31 | 0.73 | ++++++++ |
| 17: | 2.23 | 1.59 | 1.07 | ++++ |
| 18: | 1.47 | 1.19 | 0.98 | +++ |

Fig. 6d

| | PLANE 0 | | | DIAGRAM | PLANE 0 | DIAGRAM OF DIFFERENCES |
| --- | --- | --- | --- | --- | --- | --- |
| | AVG | SDEV | SEM | OF AVG | DIFF | 0 |
| 0: | 3.06 | 0.36 | 0.26 | ++++++ | 0:-0.51 | + |
| 1: | 2.71 | 0.33 | 0.23 | +++++ | 1:-0.47 | + |
| 2: | 2.57 | 0.33 | 0.23 | +++++ | 2:-047 | + |
| 3: | 2.32 | 0.25 | 0.18 | +++++ | 3:-033 | + |
| 4: | 2.11 | 0.16 | 0.11 | ++++ | 4:-0.22 | |
| 5: | 2.03 | 0.11 | 0.08 | ++++ | 5:-0.15 | |
| 6: | 1.89 | 0.14 | 0.10 | ++++ | 6:-0.20 | |
| 7: | 1.72 | 0.12 | 0.09 | +++ | 7:-0.17 | |
| 8: | 1.51 | 0.15 | 0.10 | +++ | 8:-0.21 | |
| 9: | 1.33 | 0.11 | 0.08 | +++ | 9:-0.16 | |
| 10: | 1.24 | 0.16 | 0.11 | ++ | 10:-0.23 | |
| 11: | 1.17 | 0.15 | 0.10 | ++ | 11:-0.21 | |
| 12: | 1.09 | 0.11 | 0.06 | ++ | 12:-0.16 | |
| 13: | 1.05 | 0.07 | 0.05 | ++ | 13:-0.10 | |
| 14: | 1.01 | 0.02 | 0.01 | ++ | 14:-0.03 | |
| 15: | 1.00 | 0.00 | 0.00 | ++ | 15: 0.00 | |
| 16: | 0.99 | 0.01 | 0.01 | ++ | 16:-0.01 | |
| 17: | 0.86 | 0.14 | 0.10 | ++ | 17: 0.20 | |
| 18: | 0.63 | 0.00 | 0.00 | + | 18:-0.63 | |

Fig. 7a

| PLANE 1 | | | DIAGRAM | PLANE 1 | DIAGRAM OF DIFFERENCES |
| --- | --- | --- | --- | --- | --- |
| AVG | SDEV | SEM | OF AVG | DIFF | 0 |
| 0: 5.10 | 0.78 | 0.56 | ++++++++++ | 0:-1.11 | ++ |
| 1: 4.69 | 0.72 | 0.51 | +++++++++ | 1:-1.02 | ++ |
| 2: 4.38 | 0.64 | 0.45 | +++++++++ | 2:-0.90 | ++ |
| 3: 4.14 | 0.59 | 0.42 | ++++++++ | 3:-0.84 | ++ |
| 4: 3.82 | 0.64 | 0.46 | ++++++++ | 4:-0.91 | ++ |
| 5: 3.84 | 0.61 | 0.43 | +++++++ | 5:-0.86 | ++ |
| 6: 3.27 | 0.53 | 0.38 | +++++++ | 6:-0.75 | ++ |
| 7: 3.05 | 0.46 | 0.33 | ++++++ | 7:-0.65 | + |
| 8: 2.85 | 0.41 | 0.29 | ++++++ | 8:-0.58 | + |
| 9: 2.63 | 0.37 | 0.26 | +++++ | 9:-0.53 | + |
| 10: 2.45 | 0.33 | 0.23 | +++++ | 10:-0.46 | + |
| 11: 2.27 | 0.25 | 0.18 | +++++ | 11:-0.36 | + |
| 12: 2.07 | 0.27 | 0.19 | ++++ | 12:-0.38 | + |
| 13: 1.84 | 0.29 | 0.20 | ++++ | 13:-0.41 | + |
| 14: 1.61 | 0.26 | 0.18 | +++ | 14:-0.37 | + |
| 15: 1.38 | 0.25 | 0.18 | +++ | 15:-0.36 | + |
| 16: 1.22 | 0.19 | 0.13 | ++ | 16:-0.27 | + |
| 17: 1.01 | 0.02 | 0.01 | ++ | 17:-0.03 | |
| 18: 0.71 | 0.00 | 0.00 | + | 18:-0.71 | + |

Fig. 7b

|  | PLANE 2 | | | | PLANE 2 | DIAGRAM OF DIFFERENCES |
|---|---|---|---|---|---|---|
|  | AVG | SDEV | SEM | DIAGRAM OF AVG | DIFF | 00 |
| 0: | 7.46 | 1.22 | 0.86 | +++++++++++++++ | 0:-1.73 | +++ |
| 1: | 6.80 | 1.07 | 0.76 | ++++++++++++++ | 1:-1.52 | +++ |
| 2: | 6.41 | 1.05 | 0.74 | +++++++++++++ | 2:-1.48 | +++ |
| 3: | 6.07 | 1.05 | 0.74 | ++++++++++++ | 3:-1.48 | +++ |
| 4: | 5.81 | 1.00 | 0.71 | ++++++++++++ | 4:-1.42 | +++ |
| 5: | 5.59 | 0.00 | 0.70 | +++++++++++ | 5:-1.40 | +++ |
| 6: | 5.28 | 0.99 | 0.70 | +++++++++++ | 6:-1.40 | +++ |
| 7: | 4.93 | 0.90 | 0.64 | ++++++++++ | 7:-1.27 | +++ |
| 8: | 4.57 | 0.82 | 0.58 | +++++++++ | 8:-1.16 | ++ |
| 9: | 4.25 | 0.73 | 0.51 | +++++++++ | 9:-1.03 | ++ |
| 10: | 3.94 | 0.54 | 0.38 | ++++++++ | 10:-0.77 | ++ |
| 11: | 3.57 | 0.45 | 0.32 | +++++++ | 11:-0.64 | + |
| 12: | 3.31 | 0.37 | 0.28 | +++++++ | 12:-0.52 | + |
| 13: | 3.05 | 0.30 | 0.21 | ++++++ | 13:-0.43 | + |
| 14: | 2.76 | 0.35 | 0.25 | ++++++ | 14:-0.50 | + |
| 15: | 2.35 | 0.48 | 0.33 | +++++ | 15:-0.65 | + |
| 16: | 1.89 | 0.56 | 0.39 | ++++ | 16:-0.79 | ++ |
| 17: | 1.38 | 0.30 | 0.21 | +++ | 17:-0.43 | + |
| 18: | 1.02 | 0.00 | 0.00 | ++ | 18:-1.02 | ++ |

Fig. 7c

|  | PLANE 3 | | | | PLANE 3 | DIAGRAM OF DIFFERENCES |
|---|---|---|---|---|---|---|
|  | AVG | SDEV | SEM | DIAGRAM OF AVG | DIFF | 0 |
| 0: | 10.48 | 1.03 | 0.73 | +++++++++++++++++++ | 0:-1.46 | +++ |
| 1: | 9.38 | 1.34 | 0.94 | +++++++++++++++++++ | 1:-1.89 | ++++ |
| 2: | 8.87 | 1.33 | 0.94 | ++++++++++++++++++ | 2:-1.88 | ++++ |
| 3: | 8.46 | 1.36 | 0.95 | +++++++++++++++++ | 3:-1.92 | ++++ |
| 4: | 8.10 | 1.21 | 0.85 | ++++++++++++++++ | 4:-1.71 | +++ |
| 5: | 7.77 | 1.22 | 0. | +++++++++++++++ | 5:-1.73 | +++ |
| 6: | 7.45 | 1.18 | 0.84 | +++++++++++++++ | 6:-1.67 | +++ |
| 7: | 7.08 | 1.12 | 0.79 | ++++++++++++++ | 7:-1.58 | +++ |
| 8: | 6.70 | 1.09 | 0.77 | +++++++++++++ | 8:-1.54 | +++ |
| 9: | 6.28 | 1.00 | 0.71 | ++++++++++++ | 9:-1.41 | +++ |
| 10: | 5.83 | 0.92 | 0.55 | ++++++++++++ | 10:-1.30 | +++ |
| 11: | 5.35 | 0.73 | 0.52 | +++++++++++ | 11:-1.03 | ++ |
| 12: | 4.91 | 0.66 | 0.47 | ++++++++++ | 12:-0.94 | ++ |
| 13: | 4.45 | 0.55 | 0.39 | +++++++++ | 13:-0.74 | ++ |
| 14: | 3.97 | 0.41 | 0.29 | ++++++++ | 14:-0.58 | + |
| 15: | 3.46 | 0.33 | 0.24 | +++++++ | 15:-0.47 | + |
| 16: | 2.82 | 0.43 | 0.30 | ++++++ | 16:-0.61 | + |
| 17: | 1.93 | 0.21 | 0.15 | ++++ | 17:-0.30 | + |
| 18: | 1.32 | 0.00 | 0.00 | +++ | 18:-1.32 | +++ |

Fig. 7d

METHOD OF MEASURING THE TYPES OF MOTION AND CONFIGURATION OF BIOLOGICAL AND NON-BIOLOGICAL OBJECTS

BACKGROUND OF THE INVENTION

The present invention relates to a method of measuring the types of motion and the configuration of biological and non-biological objects, particularly their motility, position in space, distancing behavior, reversal of direction and shoaling behavior, with the objects being observed and the observations being evaluated, and to uses of such a method.

The known measuring methods do not permit the detection of such behavior in a single measuring process. The prior art methods of measuring individual behavior are insufficient and expensive. An abstract and bibliography of such methods are provided in: Spieser, "Methoden der Toxizitätsprüfung an Fischen"[Methods of Testing Toxicity in Fish], published by DFG, Boldt-Verlag, Boppard, 1980. The different methods referred to in this publication possess a variety of drawbacks: either the fish are impaired (e.g. by implantation of magnets); or the measuring system is too inaccurate or very complicated, and includes many electric eyes tending to blind the animals, or the method is too inaccurate, as in the optical/optoelectronic method disclosed by Petry, Motilimat GETRA ®, or is unreliable, as in the case of measurement with standing ultrasound waves, (biopulse ®), or requires too much personnel, i.e. observers who operate time sum/frequency counters. In all of these cases, not much more than motility can be measured and this only with errors. Components of shoaling behavior can be measured only in a complicated strip cylinder apparatus or, for individual fish, in a Nakamura apparatus. Both are not practicable. Further, there exists no measuring process for fright reactions.

SUMMARY OF THE INVENTION

It is an object of the present invention to provide a sensitive and practicable testing method permitting, for example, environmental toxicology examinations of biological objects subjected to small doses which do not influence the objects, and also being used as a monitoring test.

A method for measuring the type of motion and configuration of objects by observation of the objects and evaluation of the observation results, including the steps of: producing data representative of an image of the objects in a selected plane at successive time intervals; deriving, from the data representations for each time interval a representation of only one pair of coordinate values in the plane for each object; producing, from the coordinate values, representations of motion paths for the objects during a plurality of the time intervals; and producing, from the motion path representations, representations of the path traversed by each object, and the average height position, the period of dwell and number of reversals of direction of motion of each object during the plurality of time intervals.

The simultaneous surveillance of several test objects in the same environment, e.g. an aquarium, has in the past not been possible, or would at most have been possible at considerable expense by a complete analysis of continuous images by means of a large computer. But this is impractical for economic reasons. Only the solution provided by the present invention with data reduction (on-line generation of a single coordinate pair per object and image) in conjunction with detection of object sizes down to the size of a raster dot in a video raster and making the raster coarser in adaptation to the test objects for storage of the coordinates and subsequent reconstruction of the paths of movement from these data, eliminates these expenditures. For the detection of the distancing behavior of the objects, e.g. fish, the invention provides a novel calculation system which takes into account the error produced by two-dimensional projection and which makes it easy to compare the measured results from objects of different groups, e.g. if a group is divided into a plurality of different sub-groups. The reaction to fright stimuli can here be made objective for the first time.

Thus, the present invention permits for the first time, economical and additionally simultaneous observation and documentation of a plurality of behavior patterns of many individual objects. It can be used in an economical manner in environmental toxicology examinations for long-term as well as short-term tests and around the clock for monitoring waters, etc.

BRIEF DESCRIPTION OF THE DRAWING

FIGS. 2a–7d are tables setting forth measuring results obtained with the measuring device of FIG. 1.

DESCRIPTION OF THE PREFERRED EMBODIMENTS

Figure 1:
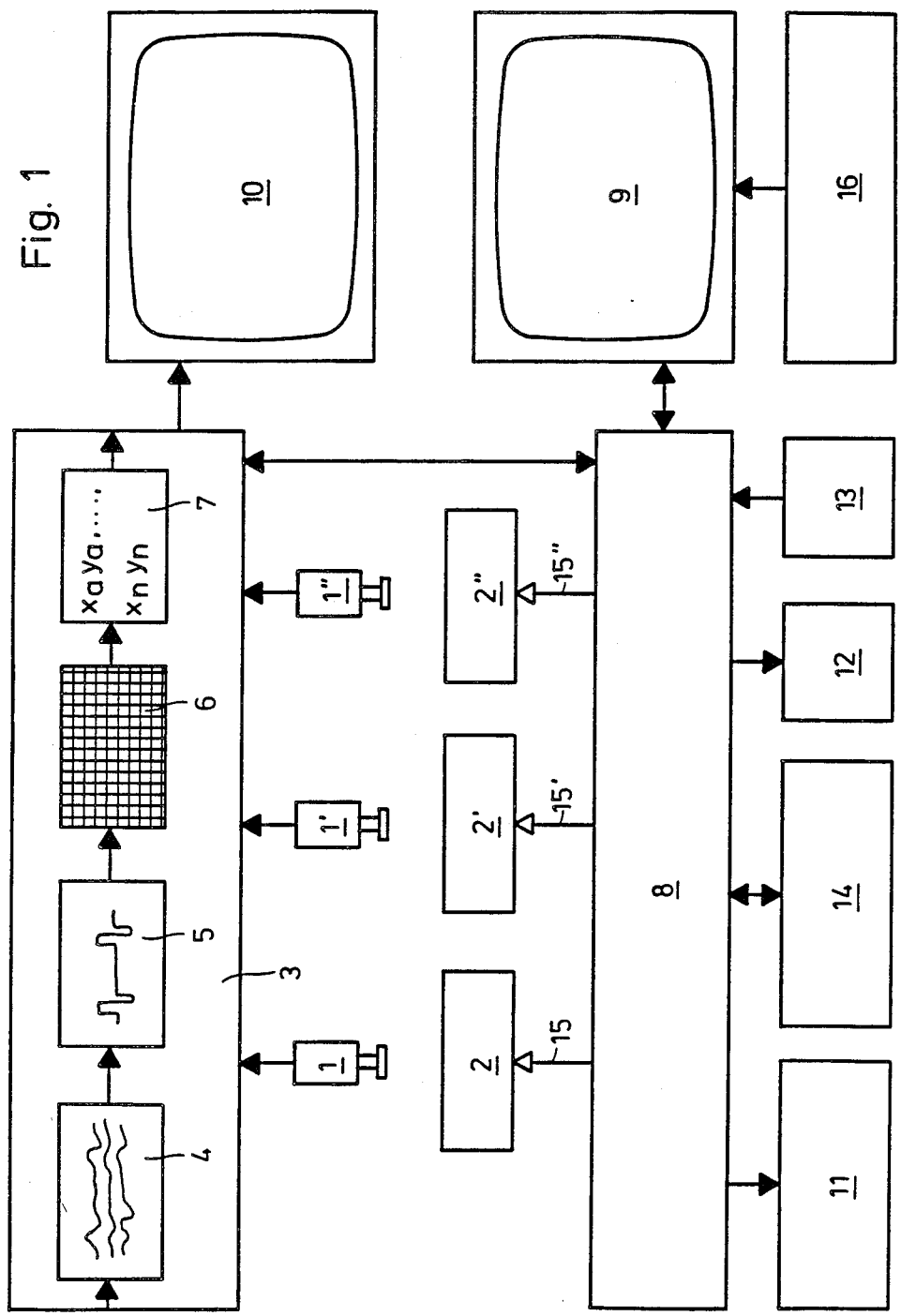
FIG. 1 is a block diagram of an embodiment of a measuring device for carrying out the invention.

Versions of the method capable of meeting various requirements will be described for individual applications. An extremely flexible, substantially freely programmable type of measuring device is shown in FIG. 1 to include at least one video camera 1, 1', 1" for each of a plurality of measuring chambers 2, 2', 2", an image processor 3 including object detection 4, signal processing 5, raster coarsening 6 and addressing 7, a data computer 8 including two drive devices and memories 14, a data display screen 9 equipped with a key field or terminal 16, an image monitor 10 and a printer 11. Alternately, use can be made of a plurality of cameras which can be interrogated in succession, automatically according to a programmed time schedule or manually. Embodiments including monitoring functions have no drive devices and are equipped with a substantially fixed program, very fast calculating system which makes its evaluations already during recording, and with an alarm system 12 or an interface 13 for appropriate regulating systems. For use in research, this high speed version can also be made to be freely programmable. The versions for use in "toxicological examinations of fish" additionally include a stimulus generator 15, 15', 15" for each measuring chamber, controlled selectively by the terminal 16 or by computer 8 for defined fright stimuli. The computer 8 can be an IBM or compatible microcomputer, e.g. TANDON at 30. The image-processor 3 can be built up on an extension card for this device.

In the method according to the invention, in contrast to all conventional image analysis methods, measurements are taken with the full picture, or frame, resolution by one or a plurality of video cameras 1 to 1", but the information content of the frames is reduced to the essential facts in the on-line process in that for each object to be detected per frame only one coordinate pair Xa, Ya; Xb, Yb; to Xn, Yn is stored. In most cases, the quantity of data is further reduced in that the frame raster 6 is made coarser by an integral multiple. Insofar as permitted by the problems to be solved, the quantity of data can be reduced even further by calling up a smaller number of frames per unit time, e.g. recording only every third or every fifth video frame.

The objects are generally detected on the basis of brightness contrast compared with their immediate environment. Objects which are brighter than some points in the image background are recognized while the background itself is not detected. Undesirable darker or brighter points and even points of the same brightness with vague outlines are not detected, depending on the setting of the device. The sensitivity of the device can be adjusted. Sharply contoured, stationary, undesirable objects may automatically be cut out by prior measurement. Usually, only a single coordinate point is cut out per object, with the remaining image surface covered by the respective object remaining sensitive. It is also possible to make additional eliminations or to cancel eliminations manually from terminal 16 by means of a cursor provided in monitor 10.

On monitor 10, the following remains visible during the measurement: identification of the sensitive, usually rectangular, picture section which assures precisely defined picture limitation, the continuous video picture to be examined, all eliminated coordinates, all objects presently "detected" by the device and the position of their coordinate points. The "true" video image may also be omitted or displayed on a separate monitor.

Fom the image data obtained from the detected objects, a subsequent computing process, or a parallel process in the high speed version, reconstructs the sequence of movement of the objects on the basis of detected characteristics of the moving objects, e.g. their location, their momentary direction of movement and their velocity. This simultaneously produces association of the coordinates Xn, Yn for the continuous images with the individual objects and also the elimination of additional undesirable objects, such as, for example, the reflections of the objects to be measured at the side walls of measuring chambers 2-2".

From the thus determined paths of movement, a field projection of the path traversed per unit time (here abbreviated as "motility"), the average height position and period of dwell and the number of reversals of direction of each object are determined. These, values are sorted according to the magnitude of the motility value which reveals more easily any possible correlations between the various measured values. The individual values can either be stored on a floppy disk together with their averages or can be printed out as a whole.

During the calculation, the coordinate sets Xn, Yn are "cleaned up", i.e. the coordinates of all objects detected to be "permanently present" are stored once more. This is done to avoid errors in the calculation of the configuration of the objects with respect to one another. In order to even further reduce the quantities of superfluous data, the program may be set up so that, if desired, not every frame but, for example, only every second frame or every tenth frame is stored a second time.

In a subsequent run routine with the thus reduced sets of data, the distancing behavior of the objects is calculated. A subprogram permits detection of possible grouping of objects, their number and average distances from the calculated centers of gravity of the groups and determination of the overall center of gravity of the objects.

To solve the problem produced by the fact that objects disposed precisely at the boundary between two sets of coordinates are associated once with the one and once with the other coordinate set, with a motility value quickly being calculated from this seeming movement (even higher motility values for stationary objects can be produced if an elongate object is disposed almost parallel to and at the borderline of a row of coordinates), a calculating mode has been developed which prevents the generation of such erroneous data.

Special data sets are provided to monitor the device. In these data sets, the type of movement of the objects are precisely given and they serve to check certain individual functions of the device.

It has been a difficult task to assure that the association of the objects with the coordinates Xn, Yn of the continuous images occurs with relative reliability, i.e. the frequency of objects being mixed up when they meet one another or when one crosses the other's path behind it is kept as low as possible. For this purpose, data sets have been generated in which encounters between two objects occur in different ways, e.g. one passes the other, or two generated objects encounter one another in the same swimming direction, with one swimming faster than the other. The swimming velocity and the duration of the encounters were varied. Similar data sets simulate encounters in opposite directions with identical motilities. There are also encounters at an angle of 90° and at 45°, with the paths of the two objects crossing in such a manner that the coordinates of the two meeting objects meet at a point, i.e. one of the objects disappears for the duration of one or two frames.

Motility was checked with data sets in which the objects traversed defined paths per unit time. Other data sets exist which simulate and check turning movement Data from live fish were also used for this purpose.

A further possibility of checking the operation of the device is the so-called "view mode". In this mode, the data set of a preceding picture, or frame, is made visible on data screen 9 during a calculation in the form of association letters for each individual object. That means that it is possible to observe the movements of the objects and the association of the coordinates Xn, Yn with individual objects in slow motion directly on data screen 9. Thus it is possible to monitor functions of the device even if there is very complex movement, i.e. whole groups of moving objects. Such monitoring takes place during calculation of the data and involves only a very slight loss of time.

It is possible to provide a complete output of all coordinates and their manner of association. However, because of the large amount of time required for observation on screen 9 or the amount of material involved in a printout 11, this is done only for test purposes. Initially, all coordinates Xn, Yn existing in a frame and not yet associated are listed. Then appear the associated coordinates of the respectively preceding frame and of the new frame provided with the association letters assigned to each object during the entire calculation, all lined up in a row. Added to this is the momentary direction of movement expressed in the form of an angular value and the motility value calculated for each object from the path traversed between the preceding frame and the current frame. While the view mode shows only an approximation of the functions of the device, error functions can be here checked in every detail.

The calculation of the distancing behavior is made in a manner not known before. In contrast to conventional methods, in which usually the distances of the individual objects from a swarm center of gravity or the distances from to the respectively next object are examined, the distancing behavior is included in the calculation in a manner which appears to be more suitable: this procedure considers the fact that if only one camera 1, 1' or 1" is employed, only the field projection of a shoal of fish is processed. The error created by shortened paths in the calculation of the distances from the projected image would become too large, i.e. data would be simulated which were not measured at all. However the decisive value for the distancing behavior in schools of fish is the immediate distance from the nearest neighbor. Therefore a field projection of these distances, is nevertheless used as the basis of the calculation process.

Computer 8 of the measuring device calculates four concentric squares around each fish (object) at a given mutual edge spacing. Then it counts separately for each fish the adjacent fishes which are now enclosed in each square. These data are arranged by size, frame for frame. For continuous fields, the numbers of neighbors are summed up, beginning always with the fish which has the most neighbors, then the fish which has the second most neighbors, etc. Identification of the fish is intentionally not made. It is known that, in a shoal of fish, those which are at the edge of the shoal continuously exchange their positions with fish at the interior of the shoal. However, it is an easily understood fact that fish in the middle of a school have more neighbors than those at the edge of a school.

By making the calculation with four square sizes, four averaged curves are produced over the entire measuring period which very well represent the distancing behavior of the fish. These curves can easily be compared with those of other groups of fish of any distribution. If several groups form in one aquarium while only one group forms in another aquarium holding the same number of fish, a comparison between these aquariums is not possible with conventional calculating modes. With the method according to the invention, however, it is very easy to make statistical comparisons of the curves.

A calculation of turning movement is made on the basis of the swimming direction. Selectively, one can sum up the times the 90° limits or the 180° limits are exceeded in the direction of swimming. If the fish are observed from the top by camera 1-1" it is recommended to select the 90° mode, since a preferred swimming direction cannot be expected. If the fish are observed from the side, it is advisable to select the 180° mode so that only movement in the horizontal plane is recorded since movement in the vertical plane represents another motion quality and it cannot be expected that the horizontal and vertical movements have the same distribution.

The, number of reversals of direction are put out separately for each individual fish and additionally an average is made for all fish, with of course the most important statistical values also being calculated.

Detection of turning movement can be observed in the "view mode" on data screen 9 during the calculation in that the letters representing the association of coordinates Xn, Yn with the individual fish are converted from upper case letters to lower case letters and vice versa with every turning movement. Additionally, special data sets have been created for the turning movement with which these individual functions of the device can also be checked.

Calculation of motility is made for every fish on the basis of the path traversed per unit time. The values are put out in such a manner that different measuring periods can also be compared with one another without conversion in that all values refer to one second, regardless of which frame frequency was selected for recording. The variations in the motility data for each individual fish shows whether a fish was uniformly active over the entire measuring period or whether it made larger pauses and had periods of greater activity in between. When the motility values of all fish are summed at the end of each measuring period (sample) the spread in values indicates the variability between the fish over the entire measuring period. That means that variations in activity during the measuring period are not incorporated in this value, only the differences between the motility values of the individual fishes per sample.

Data output can be effected selectively via data screen 9, printer 11 or to a diskette. Motility is illustrated numerically and graphically on data screen 9 and on printer 11. The curves representing distancing behavior may selectively illustrated graphically plus numerically or only numerically. In these graphs, the range of variation of the data is also indicated. Additionally, it is possible to compare the differences between the respective four curves identifying the distancing behavior in two of the measuring chambers 2-2". This is done once by subtraction of the four curve pairs and then—even with larger numbers of measuring chambers to be compared—by averaging and putting out the standard deviation of the averaged data. To save calculating time, it is possible to reduce the cleaned-up data sets for the calculation during the calculation of motility data in that, for example, only every tenth frame is recorded. The frequency of the frames to be recorded can be put in via the key field 16. If motility is not very high, a frame sequence reduced in this manner is fully sufficient to correctly display the distance relationships corresponding to actual conditions.

An additional input mode makes it possible to automatically calculate entire sequences of measurements. The data files are then called up successively, are evaluated and the calculated data are stored on a diskette. Later, these data can be observed on screen 10 or can be printed out. For versions operating with several cameras 1-1", programmable automatic read-out of the individual components at various times is provided where reference is always made to the fixed cut-out data for each camera 1-1" at the start of the measuring series.

USES OF THE DEVICE

Environmental toxicology

For testing of chemicals, plant protection agents and drugs, the behavior of fish, water fleas, microorganisms such as protozoa (paramecium), and algae (euglena, phacus, oscillatoria, etc.) as well as of birds, rats and mice can be analyzed at relatively low cost.

The values measured for protozoa and lower plants are motility and phototaxis.

The values measured for water fleas are motility and swimming height.

The values measured for fish are: for every animal, motility, average swimming height, number of reversals of direction and sholing or schooling behavior as well as the time sequences for the changes of these measured values after application of a defined fright stimulus.

The motility and social behavior of rats and mice can be economically monitored in a screening test. The results are more informative with respect to "threshold effects" than the cruel regulation LD 50.

For birds, values of interest are, in addition to motility (also in a day-night rhythm), the association of the animals with one another, the frequency of their interaction and their respective locations.

The diurnal movement of the leaves of the scarlet runner (phaseolus) are observed in the lapsed time mode and analyzed. The behavior of untreated plants is compared with those subjected to noxa in an air-conditioned chamber or to whom noxa are applied through the soil or the water. A comparison between the treated and the untreated control group is always done after corresponding time intervals. Shifts in time of the endogenous diurnal periodicity, as they have been proven to exist as a result of damage by noxa, and changes in the motion amplitude serve as criteria for ecologically damaging biological effects. In the past, such examinations were very complicated. Each individual plant had to be connected by means of a thread with a cymograph. The graphs recorded by the cymograph had to be carefully measured by hand and evaluated. The present invention now permits observation of a larger number of plants simultaneously without any further costs for apparatus. Since many plants have a diurnal motion rhythm, this method can be used for many ground and air contaminant toxicological examinations. The values measured are here, inter alia, the amplitude of the motion of the leaf tips over time, measured upon the occurrence of the respective motion maxima and the duration of movement in both directions. The measurements can be made in continuous light as well as upon a change of illumination intensity since the measuring device has a very broad range of operation.

Method for Monitoring Surface Waters, Potable Waters and Drainage Ditches

In the past, such monitoring methods have sometimes been used for fish with unsuitable test parameters. The method according to the invention here offers economical, practicable possibilities also for the use of other organisms. A comparison is made of the behavior of biological objects with desired values or with the behavior of a control group. If limit values for motion standards of test animals or plants are exceeded or not reached, an alarm signal is given. These monitoring methods can also be used for the early detection of damage to the environment.

An example for the use of the invention in animal breeding and medicine is the determination of the motility of spermatozoa and their density.

An example for the use in industry and physiology is the measurement of the flow behavior of particles in capillaries with selective detection of various directions of movement.

In behavioral research, the invention permits a description of the manner of movement of animals, their association with one another and identification of certain types of movement. Behavior in the biosphere, interactions between animals and diurnal processes can also be measured.

The following rules apply for the numeric tabulations shown in FIGS. 2–7:

The division of the measuring duration, e.g. 270 seconds, into measuring sections (samples) permits a glimpse of the reproducibility of the values.

The time interval from the beginning of the evaluation of a frame to the next frame was set at 0.1 s. Each sample is thus composed of 900 frames.

Nr.=the identification letter of the respective fish, valid only within the sample. The samples are identified by letters attached to the file name (E80A, E80B, E80C). Fish N in sample B is not identical with fish N in sample A.

SH=swimming height of the individual animal, averaged during the sample. The frame is subdivided into eight identical height zones. The lowermost zone has the number 8.

SHD=standard deviation of the swimming height during sample time, but expressed in a raster range of 32 height levels.

PPR=percentage of the presence of an object during the duration of a sample. During the time the paths of two objects intersect, position coordinates are generated only for one object.

TURN=number of changes in direction of swimming from the right to the left or from the left to the right for the respective animal during the duration of an individual measurement (sample).

MOTILITY=path traversed (field projection), expressed in field limits passed per second with the total image being rastered into 60×32 fields.

DERIVAT=a measure for changes in motility during the measuring period, with reference to the individual animal.

DIAGRAM=graphic illustration of motility.

TURNING=number of turns made by all animals (mean value) per second. To the right of it: its standard deviation.

Motility was averaged correspondingly. To the right of it: its standard deviation.

OFFSET=distance between a fish and the edge of the innermost concentric square calculated around it, expressed in coordinate field values for an image raster of 60×32 fields.

DISTANCE=distance between the concentric squares in the above sense.

PLANE 0=innermost one of the concentric squares.

PLANE 3=outermost one of the concentric squares.

PLANE 1,2=intermediate concentric squares.

AVG=average number of neighboring fish within the square.

SDEV=standard deviation for the above.

SEM=standard error of the mean.

DIFF.=difference between the respective values of the two curves to be compared.

FIGS. 2a to 2c show three successive behavior measurements of 90 seconds each for zebrafish (Brachydanio rerio Hamilton-Buchanan) in a relatively undisturbed state.

FIGS. 3a to 3c show three 90-second behavior measurements for the same fish after the addition of live water fleas, which they hunt. The greater motility and larger number of reversals of direction compared with the measurements in the rest state (FIGS. 2a to 2c) are notable.

FIGS. 4a to 4c show behavior measurements after the addition of more live water fleas. The fish are still similarly active as in the measurements according to FIGS.

3a to 3c. However, all of them are located closer to the bottom which can be read from the swimming heights (SH).

FIGS. 5a to 5d show the distancing behavior of the same fish in a relatively quiet, undisted state during the measurement of FIG. 2a.

FIGS. 6a to 6d show the distancing behavior of these fish after being fed twice with live water fleas during the measurement according to FIGS. 4. Within set limits, the fish have more neighbors compared to the conditions shown in FIGS. 5a to 5d. Thus the fish are present in greater density.

FIGS. 7a to 7d show a comparison of the curves of FIGS. 5a to 5d and 6a to 6d by averaging and computing the standard deviations and by subtraction.

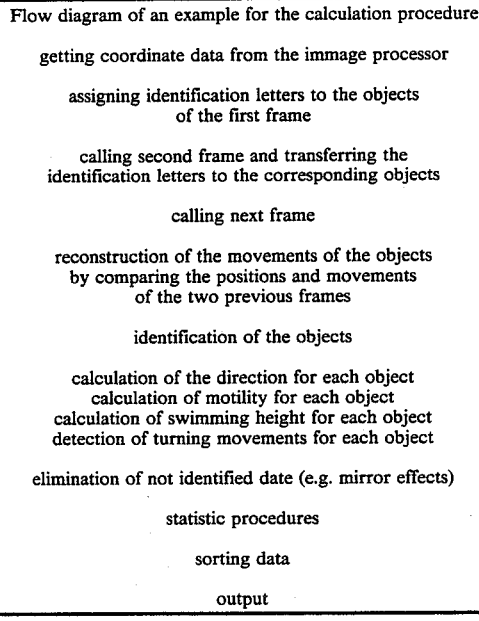

Flow diagram of an example for the calculation procedure getting coordinate data from the immage processor assigning identification letters to the objects of the first frame calling second frame and transferring the identification letters to the corresponding objects calling next frame reconstruction of the movements of the objects by comparing the positions and movements of the two previous frames identification of the objects calculation of the direction for each object
calculation of motility for each object
calculation of swimming height for each object
detection of turning movements for each object elimination of not identified date (e.g. mirror effects)

statistic procedures sorting data output

The present disclosure relates to the subject matter disclosed in Federal Republic of Germany Application No. P 35 43 515.1 of Dec. 10th, 1985, the entire specification of which is incorporated herein by reference.

It will be understood that the above description of the present invention is susceptible to various modifications, changes and adaptations, and the same are intended to be comprehended within the meaning and range of equivalents of the apended claims.

What is claimed is:

1. Method for measuring the type of motion and configuration of objects by observation of the objects and evaluation of the observation results, comprising: producing data representative of an image of the objects in a selected plane at successive time intervals; deriving, from the data, for each time interval, a representation of only one pair of coordinate values in the plane for each object; producing, from the coordinate values, representations of motion paths for the objects during a plurality of the time intervals; and producing, from the motion path representations, representations of the path traversed by each object, and the average height position and period of dwell and number of reversals of direction of motion of each object during the plurality of time intervals.

2. Method as defined in claim 1 comprising the initial step of generating the image in the selected plane by means of a video camera operating with full image resolution, and reading out the generated image on an image raster having a coarseness selected to create a small quantity of image data.

3. Method as defined in claim 2 wherein said step of generating the image is carried out to produce an image of each object on the basis of the brightness contrast between the object and its surroundings.

4. Method as defined in claim 1 further comprising the step of calculating, based on the representations produced during said last-recited producing step, data identifying the distancing and shoaling behavior of the objects.

5. Method as defined in claim 4 wherein said step of calculating further comprises calculating the grouping of objects, the number of objects in each group, the center of gravity of each group, and the average distance of the objects of each from the center of gravity of that group.

6. Method as defined in claim 5 wherein said step of calculating further comprises calculating the overall center of gravity of all groups, and the movement of each center of gravity and of the overall cente of gravity.

7. Method as defined in claim 1 further comprising documenting and analyzing, based on the representations produced during said producing steps, changes in motion pattern for each individual object.

8. Method as defined in claim 1 further comprising documenting and analyzing, based on the representations produced during said producing steps, changes in motion pattern for all objects.

9. Method as defined in claim 1 wherein the objects are animal organisms, further comprising applying a fright stimulus to the objects, and said steps of producing are carried out to provide indications of the movement and distribution of the objects in response to the fright stimulus.

10. Method as defined in claim 1 further comprising deriving, from the data, representations of the size of each object.

11. Method as defined in claim 1 further comprising deriving, from the data, representations of the total number of objects and the comparative number of moving and stationary objects.

12. Method as defined in claim 1 further comprising selectively determining, specific motion sequences.

13. Method as defined in claim 1 further comprising determining the frequency and time sequences of preferred locations in the plane.

14. Method as defined in claim 1 further comprising determining, from the data, interactions between objects.

15. Method as defined in claim 1 for testing biological effects of noxa on aquatic or terrestial organisms.

16. Method as defined in claim 1 for monitoring water bodies.

17. Method as defined in claim 1 for the early detection of environmental damage.

18. Method as defined in claim 1 for aiding behavioral research.

19. Method as defined in claim 1 for examining spermatazoa.

20. Method as defined in claim 1 for studying the behavior of living organisms in pharmacology or medical research.

21. Method as defined in claim 1 for aid in recording, evaluating and monitoring the movement of inanimate objects

* * * * *